May 12, 1925.
R. BAADER
1,537,574
CONTRIVANCE FOR CLEANING AND BONING FISH
Filed Jan. 5, 1922
5 Sheets-Sheet 2
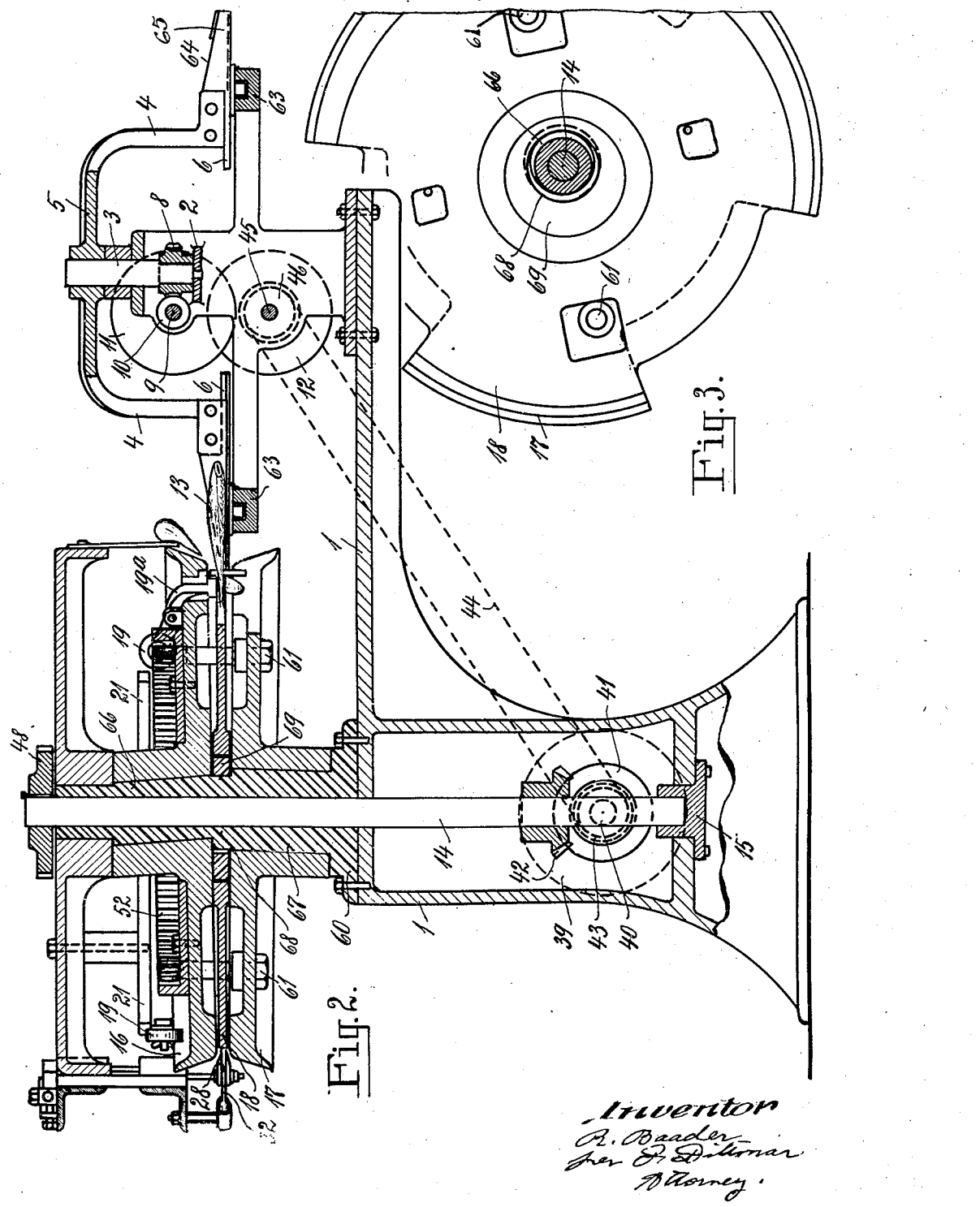

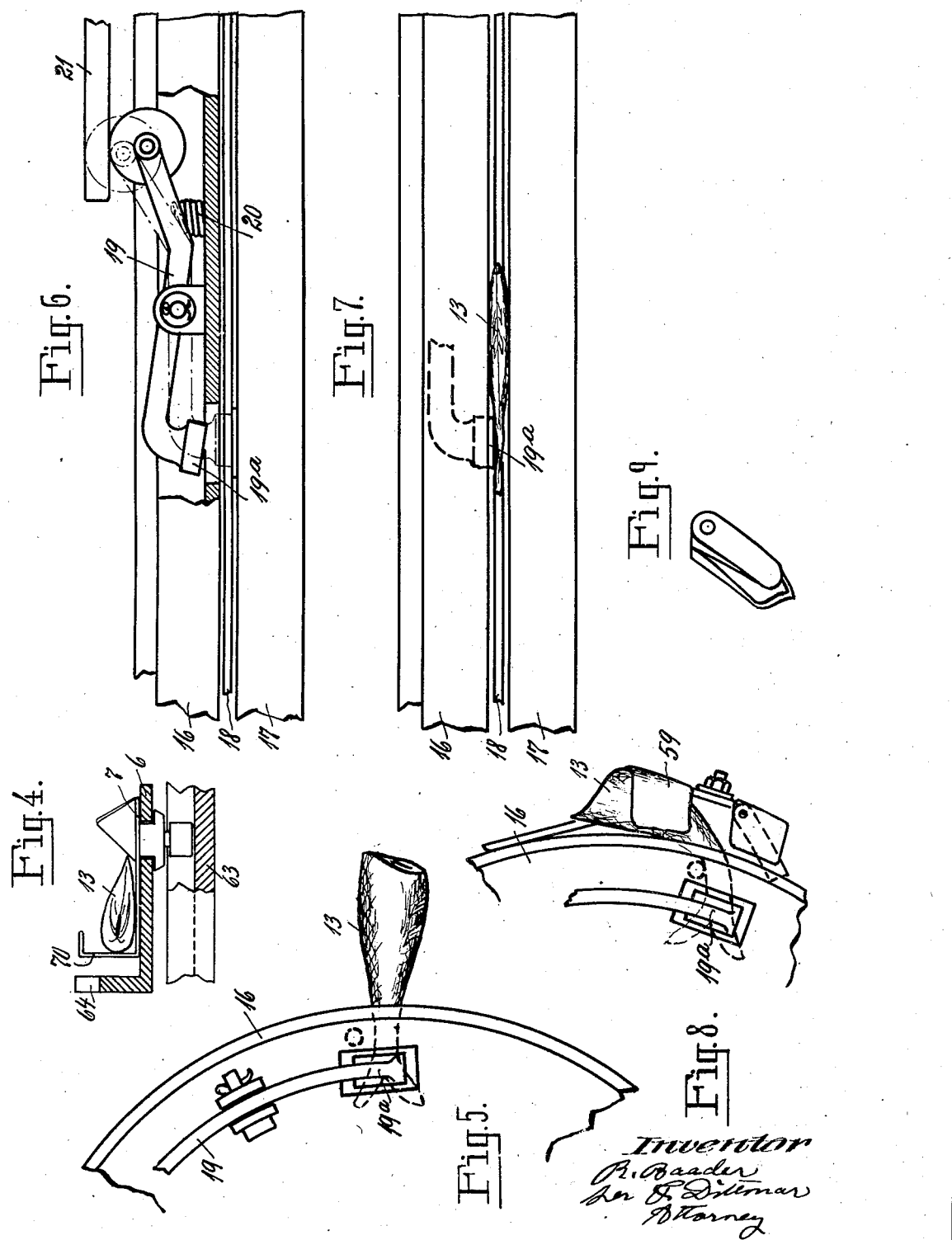

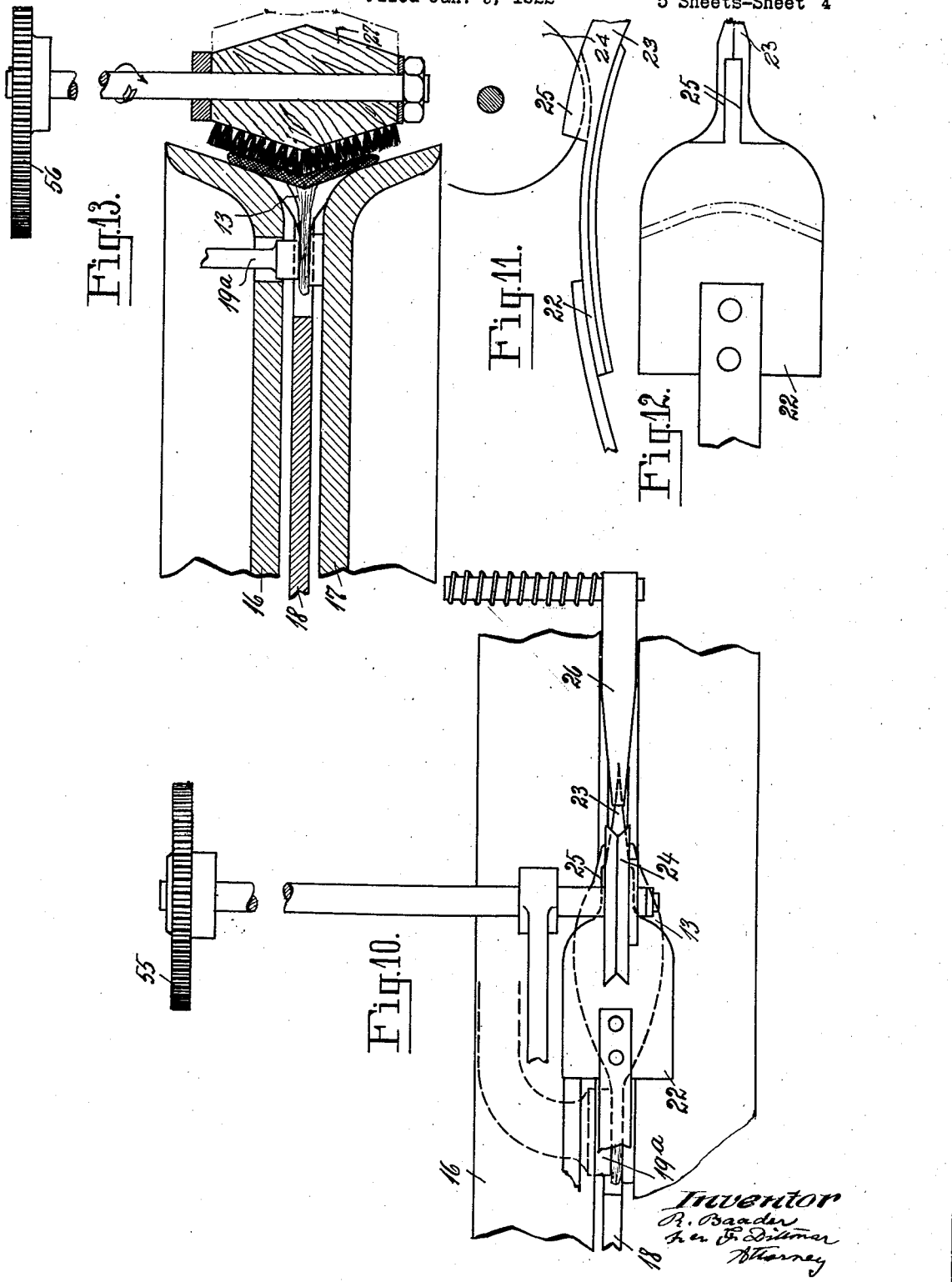

May 12, 1925. 1,537,574
R. BAADER
CONTRIVANCE FOR CLEANING AND BONING FISH
Filed Jan. 5, 1922 5 Sheets-Sheet 5
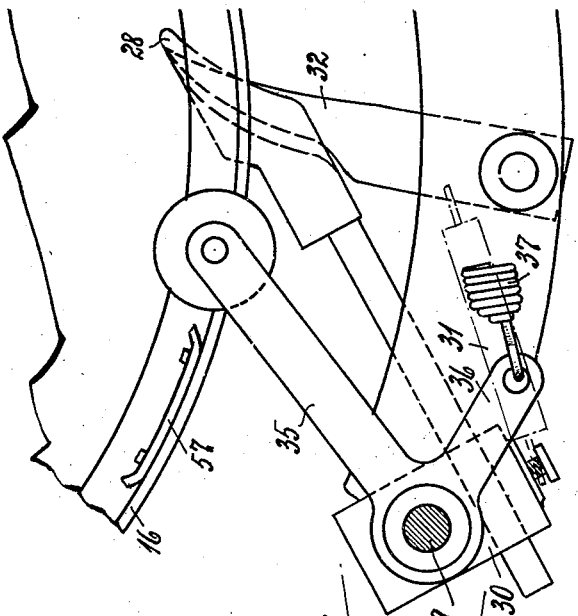
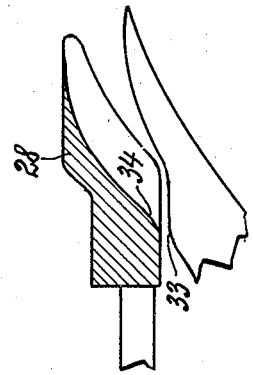
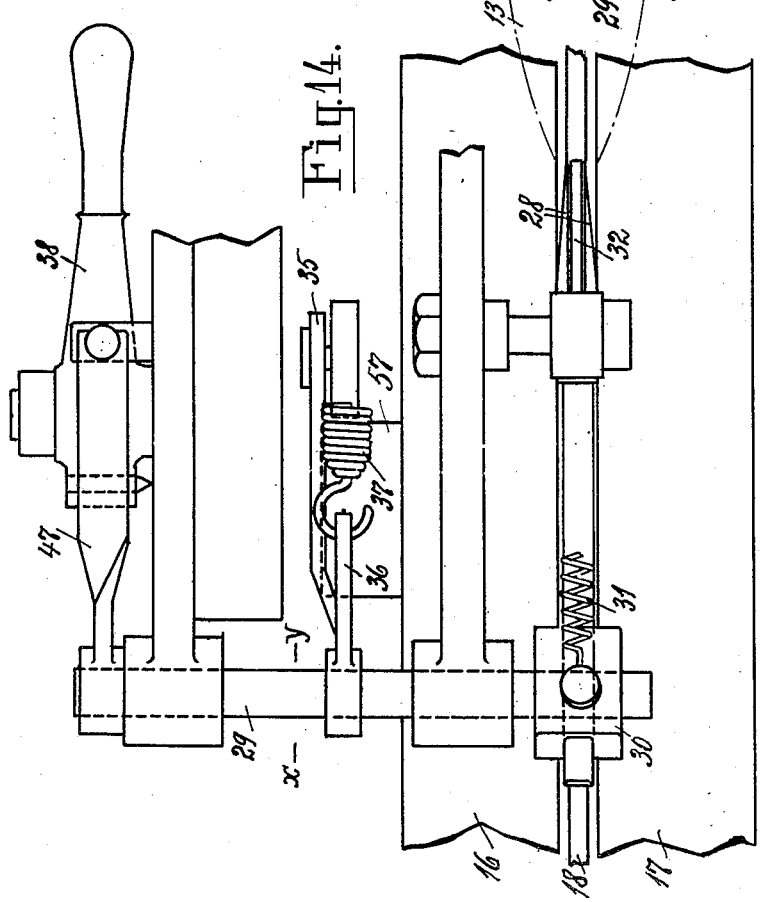
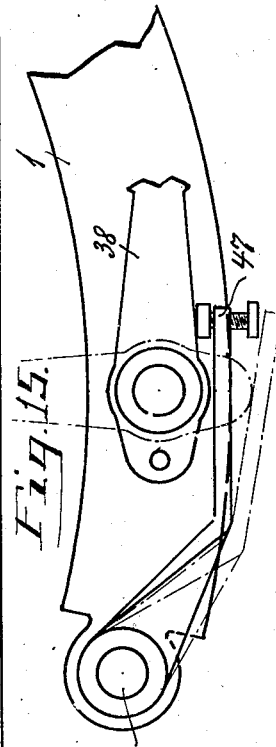

Patented May 12, 1925.

1,537,574

UNITED STATES PATENT OFFICE.

RUDOLPH BAADER, OF LUBECK, GERMANY.

CONTRIVANCE FOR CLEANING AND BONING FISH.

Application filed January 5, 1922. Serial No. 527,257.

*To all whom it may concern:*

Be it known that I, RUDOLPH BAADER, residing at 33 Wakenitzmauer, Lubeck, Germany, have invented certain new and useful Improvements in a Contrivance for Cleaning and Boning Fish, of which the following is a specification.

This invention relates to means for cleaning and boning fish, in which fish decapitated in a continuous series of operations are carried against two separated dished discs rotating at equal speeds, where they are arrested in the travel by clamp levers gripping their tails, so that their stiff back portions are located between the discs, whilst the belly flaps after being cut open rest opened out on the disc peripheries, so that the belly cavity can be easily cleaned and the back bone taken out.
A constructional example of the invention is illustrated on the accompanying drawings, in which:

Fig. 2 is a vertical section of the apparatus,

Fig. 3 is plan of the lower clamp disc,

Fig. 4 is a cross-cut through a holder, enlarged,

Figure 1:
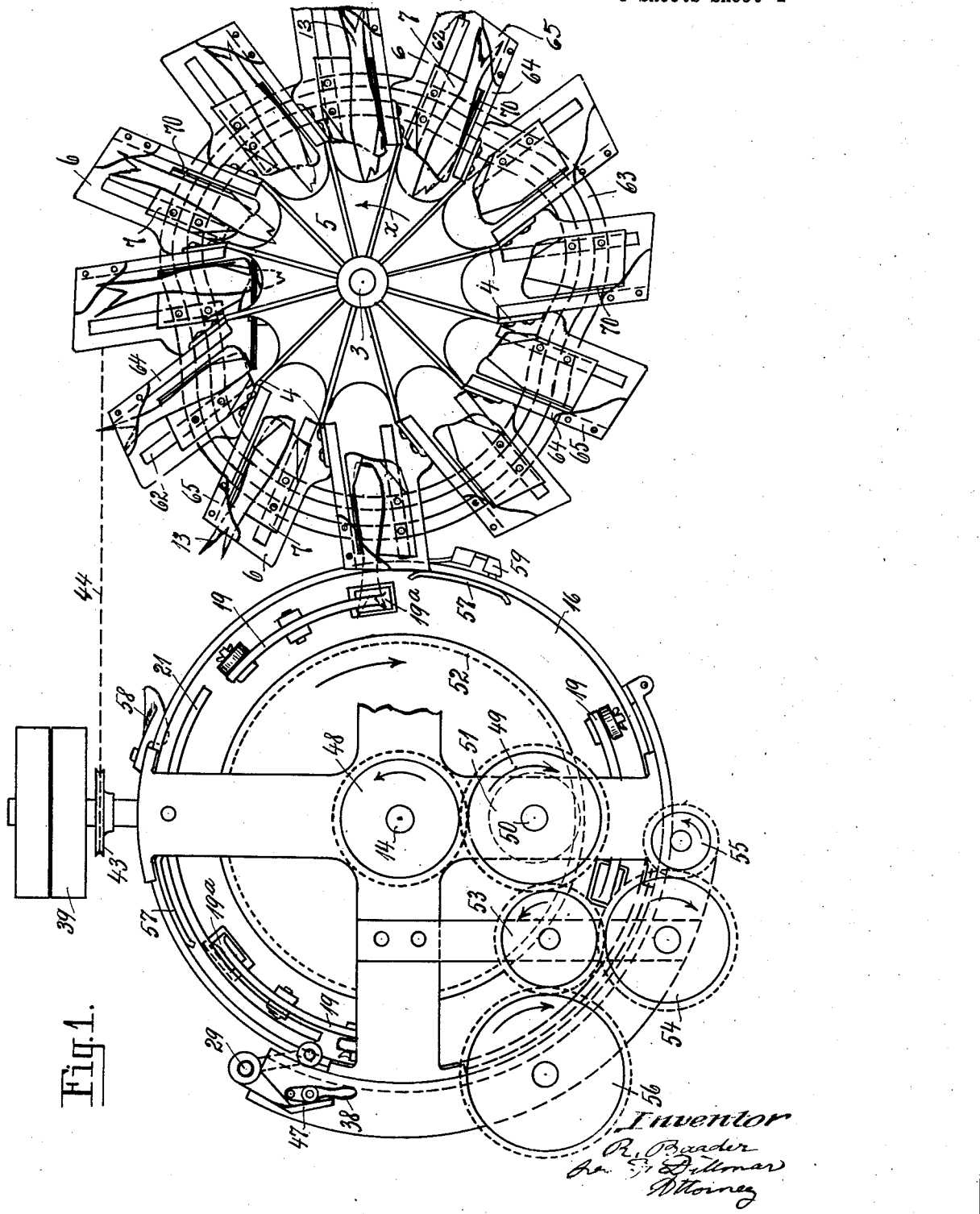
Fig. 1 is a plan.

Fig. 5 is a plan showing on an enlarged scale, the introduction of fish to the second stage of operation, Figs. 6 and 7 are side elevations on an enlarged scale, of one of the clamping levers, Fig. 8 is a plan showing on an enlarged scale, the insertion of a fish in the second stage of operation, Fig. 9 a part of the plan shown in Fig. 8, Figs. 10, 11 and 12 show on an enlarged scale, the tools for cutting open and eviscerating the fish.

Fig. 13 shows on an enlarged scale, the tool for cleaning the belly cavity,

Figs. 14, 15, 16 and 17 show on an enlarged scale, the contrivance for removing the back bones, Fig. 16 being a section on the line x—y of Fig. 14.

The frame 1 of the machine is furnished with a bearing 2, in which centrally a vertical spindle 3 is journalled. On the spindle 3 a bell-formed frame 5 is secured, on arms 4 of which radially placed guides 6 are secured in such manner, that each guide is held by two arms 4, whereby two guides 6 are fastened under or on side of each arm 4.
A shover 7 is placed on each guide 6, which shover is led in the slide 62. Underneath the guide 6 a cam 63 is affixed, through which the shover 7 at the moving of the frame 5 is steered. On a side striking ledge 64 of the guide 6 a tin 65 is so affixed that between the last and the hind edge of guide 6 a slide is formed. On the spindle 3 is secured a worm wheel 8, which gears with a worm 10 fast on a spindle 9. The spindle 9 carries a disc knife 11, which together with the disc knife 12 mounted on a spindle 45 acts shear-like.

On the machine frame 1 is also secured a tubular member 60, through which passes the driving shaft 14, stepped in a bearing 15. On the tubular member 60, the part 66 of which is eccentric, are rotatably mounted two shallow discs 16 and 17, viz: Disc 16 is located on the eccentric part 66, so that the same takes a slanting position to the disc 17 sitting on the vertical part 67. Between the discs 16 and 17 on the part 68 of the tubular member 60 eccentric disc 69 slitting disc 18 is located, whose diameter is little less than the diameters of the discs 16 and 17 so that a run 71 is formed, into which the fish 13 is pressed with its back portion. By this eccentric disc 69 the disc 18 when working between the discs 16, 17 is pushed in such manner, that the depth of the said run 71 is variable, the same being the deepest at the place where the fish is laid, and the most shallow on the place where the tools for boning are located. On the disc 16 a number of clamping levers 19, reaching through disc 16, are located, each of which levers is held in the clamping position by a separate spring 20 and is periodically released by a cam track 21. Near the discs 16, 17 is arranged the tool for cleaning the fish. For opening the fish and cutting its front belly fins, a profile member is provided, which with its rear portion 22 curved in conformity with the curvature of the discs 17, 16 is situated at such a distance from the periphery of the discs, that the belly of the fish, cut open by the pointed front portion 23 and opened by the middle portion 25, having operating rotating double knives 24, is held opened out on the combined periphery of the disc.

26 is a vertically disposed spring mounted arched rail, for so guiding the fish against the point 23 of the profile member, that the same is encountered by the middle of the belly. 27 is a rotating brush, the contour of which matches the peripheral contour of the discs 16, 17.

The tool for removing the back bone of the fish consists of a double cutting hollow knife 28, which is adjustably mounted in a holder 30 mounted on a pin 29. In the knife 28 is located the point of the lever 32 under the influence of a spring 31, which lever on the outward swinging movements of the knife 28, is caused to protrude from the latter, by its shoulder 33 running on to the solid portion 34 of the knife. The swinging out movements of the knife 28 are effected by a bell crank 35, 35 fast on the pin 29, and under the influence of a spring 37, as soon as the bell crank runs onto a cam track 57 provided on the disc 16. A lever 38 serves periodically to displace the knife 28 from the boning position, which lever on being reversed encounters a rail 47 mounted fast on the pin 29, so that rail 47 swings out and turns the pin 29 so far that the knife 28 stands without touch with discs 16, 17.

The driving of the contrivance is done from the belt pulley 39 on the spindle 40. On the spindle 40 is mounted also a bevel wheel 41, with which a bevel wheel 42 on the spindle 14 is in mesh. On the spindle 40 further is a disc 43, which by means of a belt or the like 44 is connected with a disc 46 on the spindle 45. The movements of the spindle 45 are carried on to the spindle 9 and from there by means of the worm wheels 8 and 10 set the spindle 3 and therewith the frame 5 into movement.

On the spindle 14 a spur-wheel 48 is mounted, which gears with a spur-wheel 49, on the spindle of which is mounted a spur-wheel 51 in gear with a spur toothed ring 52 provided on the disc 16. By the medium of spur-wheels 53 and 54 the movement of the spur-wheel 49 is transmitted to spur-wheels 55 and 56 mounted each on a spindle together with the double knife 24 and the brush 27 respectively.

One or more pins 61, mounted in the disc 17, which by cuttings extend through the washer disc to the disc 16, transmit the rotation of the disc 16 to the discs 18 and 17.

The action of the above described contrivance is as follows:

By virtue of the drive, the frame 5 as well as the discs 16, 17 and 18 rotate, the last disc faster than the frame. The fish to be treated are laid singly on the shover 7 of the guide 6, so that their back lies contrary to their direction of movement against the respectively bended side-wall 70 of the shover, whilst their heads reach over the front edge of the shover. By the movement of the frame 5 in the direction of $x$ the shover 7 is pushed ahead by the cam 63 and in this position passes the knives 11, 12, so that the head of the fish lying on the shover is cut away. Hereafter the shover 7 is led back through the hind edge of the guide 6 and the tin 65 when the meat of the tail gets into touch with the edge of the slide, so that the tail reaches between the discs 16 and 17 (Figs. 1 and 2). On the rotation of the discs 16, 17 the respective clamping lever slides for a short distance under the cam track 21, whereby the respective lever is opened whilst its spring 20 is strained (Fig. 6). As soon as the lever leaves the cam 21 and at the instance when its arm is directly above the tail or tail fin of the fish, the lever is pressed by its spring 20 into the clamping position, whereby the fish is firmly held for the subsequent treatment (Figs. 1, 2, 5 and 7). As the rotation of the discs 16, 17 is faster than that of the frame 5, the fish is taken from the shover and away and knocks against an abutment 59, by which the tail becomes bent, whereby simultaneously the back bone is broken at the bend which facilitates the subsequent boning, the fish 13 is pressed with its back in the broad and deep part of the run, formed by the discs 16, 17, 18 (Fig. 8). The fish 13 is now conducted under the guidance of the rail 26 against the point 23 of the profile member, which meets the fish at the bend of its tail and penetrates the belly. On further rotation of the fish the border of the belly stretches over the rear portion of the point 23, arrives against the double knife 24 and by the shears action thereof against the edge of the part 25 of the profile member is slit, whilst simultaneously the entrails are rejected by the point 23. The opened belly is opened out flat by the part 22 and sets itself with its outside against the periphery of the discs 16, 17 (Figs. 10, 13). A jet of water can then be directed against the inner surface of the belly to remove the loose slime or the like. The surface of the belly is cleaned from adherent portions of skin or the like by the brush 27 rotating in opposition to the discs 16, 17 (Fig. 13).

If the fish is to be boned, for instance preparatory to being rolled and stuffed, the duplex bladed hollow knife 28 is brought into the bone removing position, by rendering the lever 38 inoperative, so that the knife becomes situated between the discs 16, 17 (Fig. 16). On the fish encountering the points of the knife blades, these penetrate the fish at the point where the back bone has been broken and cut the bone free on both sides, whereupon the point of the lever 32 ploughs out the back bone during the passage past same of the fish.

The run 71 formed by the discs 16, 17, 18 changes on account of the position of the disc 16 its breadth and depth by the excentric situation of the disc 18, the deepest and at the same time broadest place being there, where the fish are led at the second working position and the flattest and most narrow place being there where the boning organs attach, so that the fish come deep into the run and are held in loose manner on their broadside, whereafter they are gradually clamped faster and at the same time pressed more to the outside, thereby stretching the fish and so avoiding the falling out of the fish. After the boning operation till the wiper 58 is reached the depth and breadth of the run 71 is again enlarged, so that the fish is again in slow manner released from the clamp.

After the back bone has been removed, the lever 35 runs on to a cam track 57 and swings outwards, whereby the knife 28 is also displaced. During this the lower lever 32 is withdrawn from the knife by the abutments 33 and 34, so that any back bone wedged in the knife is thrown out. The knife and lever are restored to the above removing position by the springs 31 and 57.

After the fish has had its back bone removed the respective clamping lever 19, 19ª runs under the cam track 21, whereby it is displaced, releasing the fish, which thereupon encounters the wiper 59 and by same is thrown out of the machine.

Having now particularly described and ascertained the nature of my said invention and in what manner the same is to be performed, I declare that what I claim is:

1. In a device for the purposes stated, a pair of separated discs with a passageway therebetween for the introduction of the fish, clamping levers mounted on and movable through one of the discs for gripping the tails of the fish, and knives located above and below the plane of the said discs beyond the peripheries thereof.

2. In a device for the purposes stated, a pair of separated discs with a passageway therebetween for the introduction of the fish, clamping levers mounted on and movable through one of the discs for gripping the tails of the fish, knives located above and below the plane of the discs beyond the peripheries thereof, and cam means cooperating with the discs for moving the fish toward the knives.

3. In a device for the purposes stated, a pair of separated discs with a passageway therebetween for the introduction of the fish, clamping levers mounted on and movable through one of the discs for gripping the tails of the fish, and knives located above and below the plane of the discs beyond the peripheries thereof, the axes of the said discs being inclined to the perpendicular.

4. In a device for the purposes stated, a pair of separated discs, clamping levers mounted upon and movable through one of the discs, and adapted to grip the tails of the fish, means located outside the peripheries of the discs for severing the heads of the fish, and an abutment disc disposed eccentrically to vary the depth of the run formed by said discs.

5. In a device for the purposes stated, a pair of separated discs, clamping levers mounted on one of the discs and movable therethrough, and adapted to clamp the tails of the fish, knives located at the peripheries of the discs for severing the heads of the fish, and a profile member having a portion curved in conformity with the curvature of the discs.

6. In a device for the purposes stated, a pair of separated discs, clamping levers mounted on and movable through one of the discs to grip the tails of the fish, knives located at the peripheries of the discs to sever the heads of the fish, and a profile member having a portion curved in conformity with the curvature of the discs and having a pointed front portion to cut open the fish.

7. In a device for the purposes stated, a pair of separated discs, clamping levers mounted on one of the discs and movable therethrough to grip the tails of the fish, knives located at the peripheries of the discs to sever the heads of the fish, and a profile member having a portion curved to conform to the curvature of the discs and having a pointed front and also double knives.

8. In a device for the purposes stated, a pair of separated discs, clamping levers mounted on one of the discs and movable therethrough to firmly grip the tails of the fish, and a profile member having a portion curved in conformity to the curvature of the discs and having a pointed front end and double rotary knives.

9. In a device for the purposes stated, a pair of separated discs, clamping levers pivotally mounted on one disc and movable therethrough to grip the tails of the fish, a profile member having a portion curved to conform to the curvature of the discs, and having a pointed end and double knives, and a wiper for throwing the fish out of the machine.

10. In a device for the purposes stated, a pair of separated discs, clamping levers mounted on one disc and projecting therethrough to grip the tails of the fish, a profile member having a portion curved to conform to the curvature of the discs, and having a pointed end and double knives, a wiper for throwing the fish out of the machine, and means for releasing the fish after they are boned.

11. In a device for the purposes stated, a pair of separated discs, clamping levers pivotally mounted on one of the discs and movable therethrough to grip the tails of the fish, guides serving to bend the fish, means for severing the heads of the fish, means for boning the fish, a profile member having a pointed end and provided with knives, and means for releasing the boned fish.

12. A contrivance for cleaning and means for boning fish, the combination of two dished discs separated from each other and means for rotating the same, means serving to guide the fish between two discs, clamping levers to hold the fish tails, and guides serving to bend the fish.

13. In a contrivance for cleaning and boning fish, the combination of two separated dished discs rotating in unison, shovers for pushing the fish, a number of clamping levers serving to guide the fish between the discs, a frame and holders on which the levers move horizontally against the discs.

14. In a contrivance for cleaning and boning fish, the combination of two separated dished discs rotating in unison, a number of clamping levers mounted on one of the said discs serving to guide the fish between the discs, and means for forming a curved way through which the levers are guided.

15. In a contrivance for cleaning and boning fish, the combination of two separated dished discs rotating in unison, means serving to guide the fish between the discs, and clamping levers for gripping the tails of the fish, and means on which the discs rotate with equal rapidity.

16. In a contrivance for cleaning and boning fish, the combination of two separated dished discs rotating in unison, means serving to guide the fish between the discs, clamping levers for gripping the tails of the fish, one disc being mounted to rotate horizontally, and the other disc being mounted to rotate somewhat inclined from the horizontal line.

17. In a contrivance for cleaning and boning fish, the combination of two separated dished discs rotating in unison, means serving to guide the fish between the discs, clamping levers for gripping the tails of the fish, means partly inclined from the perpendicular line, and an excentric disc, secured between the discs on the said means.

18. In a contrivance for boning and cleaning fish, the combination of two separated dished discs rotating in unison, means serving to guide the fish between the discs, clamping levers for gripping the tails of the fish, means partly inclined from the perpendicular line, an excentric disc, and an abutment disc, secured loosely on the excentric disc, and movably secured to the discs.

19. In a contrivance for cleaning and boning fish, the combination of two separated dished discs, an abutment disc secured between the said discs, of which the lower and the abutment discs run horizontally, while the upper disc runs inclined from the horizontal line.

20. In a contrivance for cleaning and boning fish, the combination of two separated dished discs, an abutment disc secured between the discs, through which a run is formed to receive the fish, having deep and narrow and again shallow and broad parts formed therein.

21. In a contrivance for boning and cleaning fish, the combination of two separated dished discs rotating in unison, means serving to guide the fish between the discs, means serving to grip the tails of the fish, and guides serving to bend the fish, the forward part of which having a knife serving to open the stomach of the fish, the middle part having a double knife, and the latter part forming a flat part running parallel to the discs.

22. In a contrivance for boning and cleaning fish, the combination of two separated dished discs rotating in unison, means serving to guide the fish between the discs, means serving to grip the tails of the fish, and guides serving to bend the fish, said guide having in its forward part a knife serving to open the stomach of the fish, and in its middle part having a double knife which rotates in the guide.

23. In a contrivance for cleaning and boning fish, the combination of two separated dished discs rotating in unison, means serving to guide the fish between the discs, means serving to grip the tails of the fish, guides serving to bend the fish, forms for receiving the body of the fish, having means to cut open the fish, and means serving to separate the opened parts, and a brush having a profile corresponding to the contour of the peripheries of the said discs.

24. In a contrivance for cleaning and boning fish, the combination of two separated dished discs rotating in unison, means serving to guide the fish between the discs, means serving to grip the tails of the fish, guides serving to bend the fish, forms for receiving the body of the fish, having means to cut open the stomach of the fish, and means serving to open out the cut parts, a brush having a profile corresponding to the contour of the peripheries of the said discs, a double cutting hollow knife, and a lever having a spring the point of which is secured in the hollow knife and a double lever comprising a spring therein.

25. In a contrivance for cleaning and boning fish, the combination of two separated dished discs rotating in unison, means serving to guide the fish between the discs, means serving to grip the tails of the fish, guides serving to bend the fish, forms for receiving the body of the fish, having means to cut open the fish, and means serving to separate the opened parts, and a brush having a profile corresponding to the contour of the peripheries of the said discs, a double cutting hollow knife, a lever having a spring, the point of which is located in the hollow knife and a double lever having a spring and a curved surface on the upper part of the disc surface, serving to guide the double lever and the therewith connected double knife and lever.

26. In a contrivance for cleaning and boning fish, the combination of two separated dished discs rotating in unison, means serving to guide the fish between the discs, means serving to grip the tails of the fish, and a curved guide way on the upper disc, serving to raise the clamping levers out of their gripping position.

27. In a contrivance for cleaning and boning fish, the combination of two separated dished discs rotating in unison, means serving to guide the fish between the discs, means serving to grip the tails of the fish, guides serving to bend the fish, forms for receiving the body of the fish, having means to cut open the fish, and means serving to separate the opened parts, a brush having a profile corresponding to the contour of the peripheries of the discs, a double cutting hollow knife, a lever having a spring, the point of which is located in the hollow knife, a double lever having a spring guided by a curved guide way, and a wiper for throwing off the fish out of the machine.

In testimony whereof I affix my signature in the presence of two witnesses.

RUDOLPH BAADER.

Witnesses:
 WILHELM GRAEFE,
 M. ROHDE.